United States Patent
Hidesawa

(10) Patent No.: US 6,894,893 B2
(45) Date of Patent: May 17, 2005

(54) ELECTRONIC APPARATUS

(75) Inventor: Shigeru Hidesawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/947,567

(22) Filed: Sep. 7, 2001

(65) Prior Publication Data

US 2002/0006750 A1 Jan. 17, 2002

Related U.S. Application Data

(63) Continuation of application No. PCT/JP99/01164, filed on Mar. 10, 1999.

(51) Int. Cl.$^7$ ................................................ G06F 1/16
(52) U.S. Cl. ........................ 361/683; 361/684; 361/686; 429/98; 439/500
(58) Field of Search ................................. 361/683, 684, 361/686, 727, 752, 724–726; 429/96–100; 16/110.5, 223; 312/223.1, 223.2; 200/52 R; 439/500; 320/2, 112

(56) References Cited

U.S. PATENT DOCUMENTS

| | | | | |
|---|---|---|---|---|
| 4,423,465 A | * | 12/1983 | Teng-Ching et al. | 361/394 |
| 4,680,674 A | * | 7/1987 | Moore | 361/395 |
| 4,769,764 A | * | 9/1988 | Levanon | 364/708 |
| 5,058,045 A | * | 10/1991 | Ma | 364/708.1 |
| 5,132,876 A | * | 7/1992 | Ma | 361/394 |
| 5,187,422 A | * | 2/1993 | Izenbaard et al. | 320/2 |
| 5,251,105 A | * | 10/1993 | Kobayashi et al. | 361/683 |
| 5,290,178 A | * | 3/1994 | Ma et al. | 439/652 |
| 5,327,067 A | * | 7/1994 | Scholder | 320/2 |
| 5,459,637 A | * | 10/1995 | Ma et al. | 361/686 |
| 5,460,547 A | * | 10/1995 | Belt et al. | 439/638 |
| 5,600,542 A | * | 2/1997 | Malgouires | 361/732 |
| 5,677,827 A | | 10/1997 | Yoshioka et al. | 361/683 |
| 5,729,478 A | * | 3/1998 | Ma et al. | 364/708.1 |
| 5,739,596 A | * | 4/1998 | Takizawa et al. | 307/66 |
| 5,754,112 A | * | 5/1998 | Novak | 340/635 |
| 5,883,820 A | | 3/1999 | Ota et al. | 364/708.1 |
| 6,050,658 A | * | 4/2000 | O'Sullivan et al. | 312/223.1 |
| 6,084,768 A | * | 7/2000 | Bolognia | 361/685 |
| 6,108,199 A | * | 8/2000 | Bonardi et al. | 361/686 |
| 6,151,401 A | * | 11/2000 | Annaratone | 381/388 |
| 6,191,552 B1 | * | 2/2001 | Kates et al. | 320/112 |
| 6,236,564 B1 | * | 5/2001 | Fan | 361/695 |
| 6,373,706 B1 | * | 4/2002 | Kasahara et al. | 361/725 |
| 6,411,503 B1 | * | 6/2002 | Kambayashi et al. | 361/683 |

FOREIGN PATENT DOCUMENTS

| | | | | |
|---|---|---|---|---|
| EP | 0 666 523 A2 | | 8/1995 | |
| EP | 1 030 239 A2 | | 8/2000 | |
| JP | 404025914 A | * | 1/1992 | G06F/1/16 |
| JP | 4-47726 | | 4/1992 | |
| JP | 4-115753 | | 10/1992 | |
| JP | 7-210271 | | 8/1995 | |
| JP | 7-219682 | | 8/1995 | |
| JP | 409245754 A | * | 9/1997 | H01M/2/10 |
| JP | 10-116133 | | 5/1998 | |
| JP | 410225004 A | * | 8/1998 | H02J/7/02 |

\* cited by examiner

*Primary Examiner*—Michael Datskovskiy
(74) *Attorney, Agent, or Firm*—Armstrong, Kratz, Quintos, Hanson & Brooks, LLP

(57) ABSTRACT

An electronic apparatus has a first attachment portion to which a first component can be attached to the front of the apparatus body, and a second attachment portion which has a substantially same construction as the first attachment portion and to which a second component can be attached to the rear of the apparatus body. Thus, the first component and the second component can be attached the electronic apparatus to thereby improve the performance of the electronic apparatus. When the first and second components are battery packs, two battery packs of the same shape can be attached to the electronic apparatus.

14 Claims, 8 Drawing Sheets

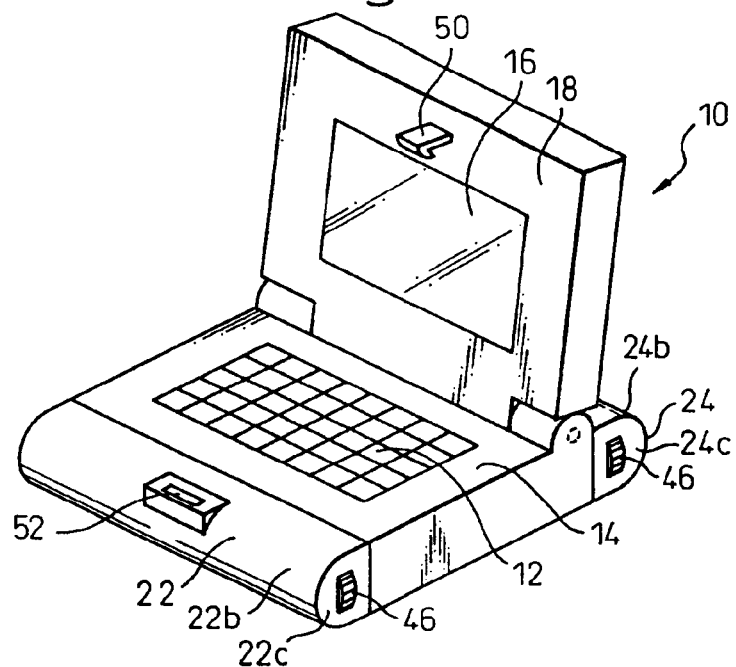
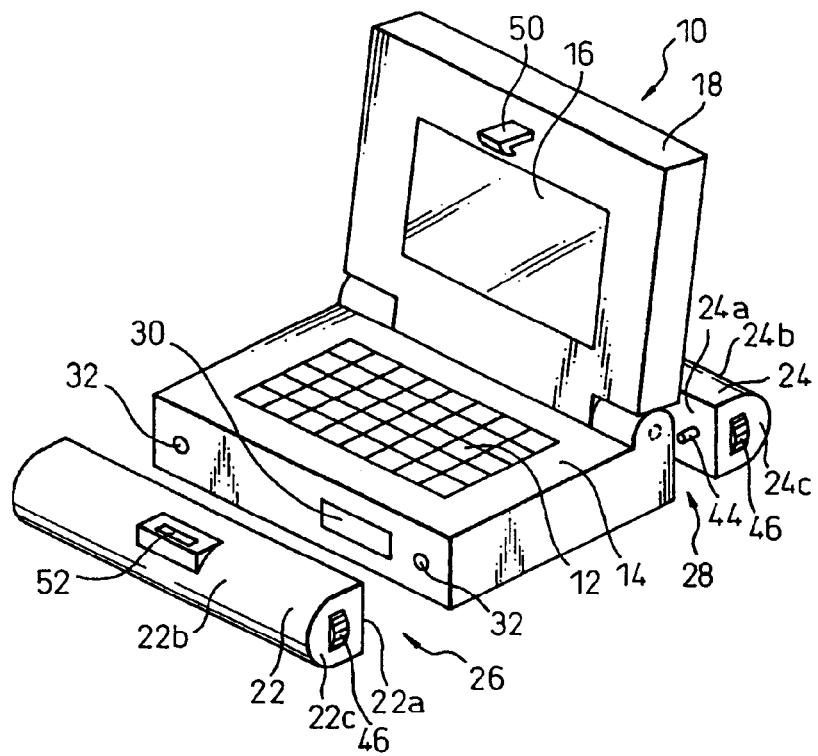

ELECTRONIC APPARATUS

CROSS-REFERENCE TO RELATED APPLICATIONS

This application is a continuation of PCT/JP99/01164 filed March 10, 1999.

BACKGROUND OF THE INVENTION

1. Field of the Invention

The present invention relates to an electronic apparatus. More particularly, the present invention relates to a battery support structure for a portable type information processing apparatus such as a notebook type personal computer.

2. Description of the Related Art

Recently, electronic information processing apparatuses have become increasingly small and light-weight so as to be suitable for use as portable type information processing apparatuses. A portable type information processing apparatus usually includes a battery that has a relatively large capacity and the battery is usually accommodated in the apparatus body since replacement of a battery is seldom required. However, miniaturization of the battery itself is also required, so there is a case in which replacement of the battery is necessary depending upon the relationship between the capacity, the weight and the volume of the battery.

If the battery is accommodated in the apparatus body, the battery cannot be readily replaced. It is desirable, in order to facilitate the replacement of the battery, to have the battery detachably attached to the apparatus body so as to be easily removed and attached from outside the apparatus body.

Japanese Unexamined Patent Publication (Kokai) No. 3-27596 discloses a small size electronic apparatus in which a battery is disposed in a recess provided on the apparatus body such that the surface of the battery is exposed and serves as a part of the exterior surface of the apparatus body.

Japanese Unexamined Patent Publication (Kokai) No. 6-163015 discloses a battery pack accommodating structure in which a recess is provided in the side of the apparatus body so that the battery can be attached to the apparatus body by inserting it into this recess.

Japanese Unexamined Patent Publication (Kokai) No. 8-76887 discloses a reduced-height structure for an information processing apparatus in which a battery can be attached to the rear of the apparatus body.

Japanese Unexamined Patent Publication (Kokai) No. 8-55617 discloses a battery pack and its connection structure in which, when a battery is mounted inside the apparatus body, the battery can be connected to the connector inside the apparatus body, from any of the upper, lower or lateral direction.

Japanese Unexamined Patent Publication (Kokai) No. 10-116133 discloses a portable type information processing apparatus in which a connector is provided in the apparatus body such that an expansion connector box can be connected to this connector. The expansion connector box has a connector to be connected to the connector in the apparatus body, as well as a plurality of connectors to be connected to other components of the apparatus.

Also, in this patent publication, the expansion connector box can include an expansion battery (external battery), in addition to a built-in battery (internal battery) contained in the apparatus body. In the information processing apparatus including the internal and external batteries, the information processing apparatus can be operated using the external battery, even if the internal built-in battery has run down, or the operating range of the information processing apparatus may be further expanded by increasing the capacity of the external battery.

In the information processing apparatus including the internal and external batteries, however, when the built-in battery has run down, it is not easy to remove it for recharging. Also, the battery used in the information processing apparatus is used as a battery pack molded with resin.

The built-in battery pack used as an internal battery and the external battery pack used as an external battery are in general dissimilar in appearance and structure since one is disposed inside the information processing apparatus and the other is detachably attached from outside to the information processing apparatus. Thus, two kinds of battery packs, that is, a built-in battery pack and an external battery pack, must be provided, which in turn requires two types of molds for molding battery packs with resin, which increases the cost of development of battery packs.

SUMMARY OF THE INVENTION

It is an object of the present invention to provide an electronic apparatus to which two similar components can be attached.

It is an object of the present invention to provide an electronic apparatus to which two similar batteries can be attached.

To attain the above-mentioned objects, an electronic apparatus, according to the present invention, comprises a first attachment portion which is provided in an apparatus body and to which a first component can be attached, and a second attachment portion which is disposed also in the apparatus body at a position different from the first attachment portion and has a substantially same structure as the first attachment portion and to which a second component can be attached.

In this way, it is possible to attach the first and second components to the electronic apparatus and thereby contribute to an improvement in the performance of the electronic apparatus. If the first and second components are battery packs, two battery packs of the same shape can be attached to the electronic apparatus. When one of the batteries has run down, the electronic apparatus may be operated with the other battery, or the capacity of the two batteries may be adapted to a desired operation of the electronic apparatus.

Because two battery packs of the same shape can be attached to the electronic apparatus, the development cost of battery packs is lower. Therefore, battery packs having greater capacity with the same shape can be developed at relatively low cost so that batteries may have longer life than before or a use may select, in combination, a suitable weight and capacity for the battery as the user desires. It is thus possible to easily realize a battery pack of greater capacity which achieves a suitable combination of weight and capacity. Attachment to an electronic apparatus is also simplified.

Thus, at least one of the first and second components is a battery pack. Preferably, both the first and the second components are battery packs. However, the first and second components need not be battery packs. For example, at least one of the first and second components may be a connector box to which an additional component can be attached.

In this case, the first attachment portion includes a first connector for electrically connecting the first component to the apparatus body and a first mechanical connection means for mechanically connecting the first component to the apparatus body, and the second attachment portion includes a second connector for electrically connecting the second component to the apparatus body and a second mechanical connection means for mechanically connecting the second component to the apparatus body, the relationship between the first connector and the first mechanical connection means being substantially the same as the relationship between the second connector and the second mechanical connection means.

The first attachment portion is disposed at the front of the apparatus body, and the second attachment portion is disposed at the rear of the apparatus body. The first and second components can be detachably attached to the apparatus body from outside the apparatus body. The first and second components extend along the front and the rear of the apparatus body, respectively. Preferably, the first and second components have lengths equal to or greater than the length of the front and the rear of the apparatus body.

In this manner, when the first and second components are attached to the apparatus body, the first and second components form a part of the exterior surface of the apparatus body.

Depending upon the situation of usage (location of usage, peripheral devices connected, or the like), the battery pack and the connector box may be attached either to the first or to the second attachment portion. This can be optionally decided by the user.

The electronic apparatus is a notebook type information processing apparatus comprising a part including a keyboard and another part pivotably mounted to the part including the keyboard and including a display. In this case, the first and second attachment portions are provided at the front and rear of the part including the keyboard.

The first and the second components have engaging means, and the part including the display has locking means which can be engaged with engaging means of one of the first and second components attached to the front of the part including the keyboard when the part including the display is closed relative to the part including the keyboard.

BRIEF DESCRIPTION OF THE DRAWINGS

The present invention will now be described with reference to appended drawings showing embodiments thereof, in which:

FIG. 1 is a perspective view showing an electronic apparatus according to the first embodiment of the present invention;

FIG. 2 is an exploded perspective view showing the electronic apparatus of FIG. 1;

DETAILED DESCRIPTION OF THE PREFERRED EMBODIMENTS

Figure 3:
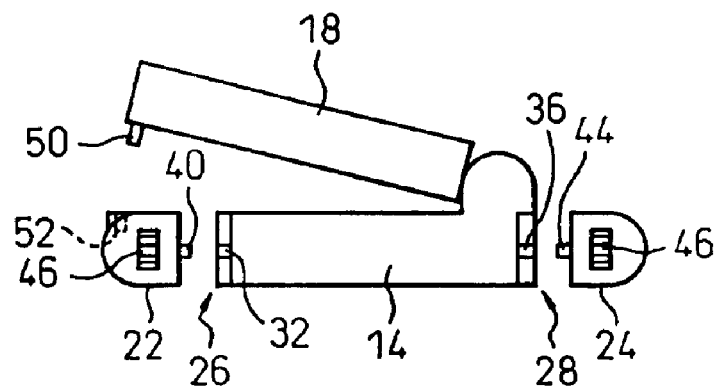
FIG. 3 is a side view showing the electronic apparatus of FIG. 2.

FIGS. 1 to 7 show an electronic apparatus according to the first embodiment of the present invention. FIGS. 1 and 2 are views showing the electronic apparatus (portable type information processing apparatus) 10 constructed as a notebook type personal computer. The electronic apparatus 10 has a part 14 including a keyboard 12 and another part 18 pivotally attached to the part 14 including the keyboard 12 and including a display 16. The part 14 including the keyboard 12 is referred to as an apparatus body, and includes electronic components under the keyboard 12.

Figure 4:
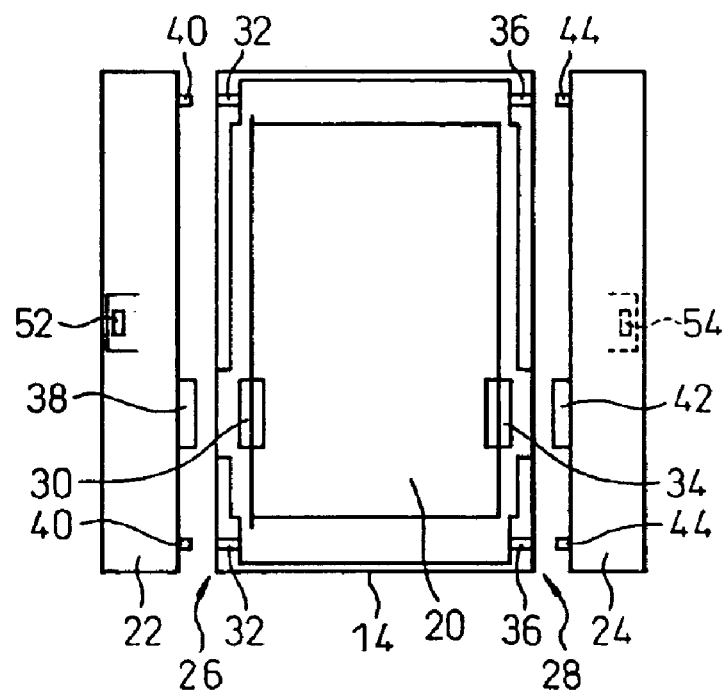
FIG. 4 is a plan view showing the electronic apparatus of FIG. 2.

FIG. 4 shows the part 14 including the keyboard 12 in the state in which the keyboard 12 is removed, with the part 18 including the display 16 omitted. A printed circuit board 20, for example, is disposed in the part 14 including the keyboard 12. The keyboard 12 and the display 16 are controlled by the electronic components provided on the printed circuit board 20.

The part 14 including the keyboard 12 is formed in a generally rectangular surface shape. A first battery pack 22 is disposed in the front of the part 14 including the keyboard 12, and a second battery pack 24 is disposed in the rear of the part 14 including the keyboard 12. As shown in FIGS. 2 to 4, the part 14 including the keyboard 12 include a first attachment portion 26 to which the first battery pack 22 can be attached, and a second attachment portion 28 to which the second battery pack 24 can be attached. The first attachment portion 26 is disposed in the front end surface of the part 14 including the keyboard 12 and the second attachment portion 28 is disposed in the rear end surface of the part 14 including the keyboard 12.

The first battery pack 22 and the second battery pack 24 extend long along the front and the rear, respectively, of the part 14 (apparatus body) including the keyboard 12. Preferably, the first battery pack 22 and the second battery pack 24 have a length not less than half a length of the front or the rear of the apparatus body. In the embodiment, the first battery pack 22 and the second battery pack 24 have a length approximately equal to a length of the front or the rear of the apparatus body. Because the battery pack is formed so as to have a length approximately equal to a length of the front of the apparatus body, it serves as a palm rest, when attached to the apparatus body.

The first battery pack 22 and the second battery pack 24 are constructed in such a way that lithium cells are molded with, and are covered by, resin. The first battery pack 22 and the second battery pack 24 have the same appearance and shape, and have the same battery capacity. However, the first battery pack 22 and the second battery pack 24 may have the same appearance and shape, but may have different battery capacity.

Each of the first battery pack 22 and the second battery pack 24 has a flat side 22a or 24a, a curved side 22b or 24b, and a flat end surface 22c or 24c. When the first battery pack 22 and the second battery pack 24 are attached to the part 14 including the keyboard 12, the flat sides 22a and 24a are brought into close contact with the front end surface and rear end surface of the part 14 including the keyboard 12.

When the first battery pack 22 and the second battery pack 24 are attached to the part 14 including the keyboard 12, the first battery pack 22 and the second battery pack 24 form parts of the exterior surface of the apparatus body. Thus, the part 18 including the display 16 can be arranged so as to cover the first battery pack 22.

The first attachment portion 26 includes a first connector 30 for electrically connecting the first battery pack 22 to the apparatus body and a first mechanical connection means (threaded hole) 32 for mechanically connecting the first battery pack 22 to the apparatus body. The second attachment portion 28 includes a second connector 34 for electrically connecting the second battery pack 24 to the apparatus body and a second mechanical connection means (threaded hole) 36 for mechanically connecting the second battery pack 24 to the apparatus body.

The relationship between the first connector 30 and the first mechanical connection means 32 is substantially the same as the relationship between the second connector 34 and the second mechanical connection means 36. The first connector 30 and the second connector 34 are attached to the printed circuit board 20. Thus, contrary to the construction shown in the figures, the first battery pack 22 may be attached to the second attachment portion 28 and the second battery pack 24 may be attached to the first attachment portion 26.

The first battery pack 22 includes a connector 38 and a screw 40, the connector 38 being engaged with the first connector 30 and the screw 40 being threadedly engaged with the first mechanical connection means (threaded hole) 32. The second battery pack 24 includes a connector 42 and a screw 44, the connector 42 being engaged with the second connector 34 and the screw 44 being threadedly engaged with the second mechanical connection means (threaded hole) 36.

As shown, the first attachment portion 26 is located at the front of the apparatus body, and the second attachment portion 28 is located at the rear of the apparatus body, the first battery pack 22 and the second battery pack 24 being detachably attached to the apparatus body from outside the apparatus body.

Figure 5:
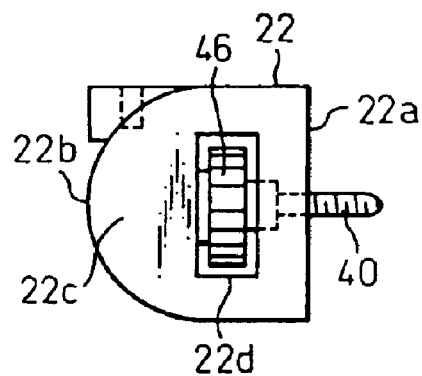
FIG. 5 is a side view showing the battery pack in FIGS. 1 to 4.
Figure 6:
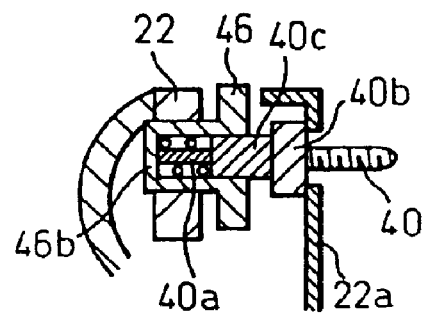
FIG. 6 is a cross sectional view showing the battery pack of FIG. 5.
Figure 7:
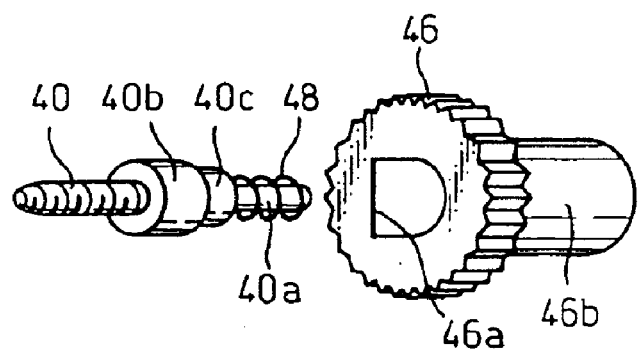
FIG. 7 is an exploded perspective view showing the screw attaching part of the battery pack of FIG. 5.

FIGS. 5 to 7 are views showing the construction of the attaching portion of the screw 40 (44). The screw 40 is provided at the front portion of a stem 40a. A large diameter section 40b and a D-shaped section 40c are provided in the intermediate portion of the stem 40a. The attaching portion of the screw 40 includes an operating wheel 46, which includes D-shaped hole 46a and a cylindrical portion 46b with a bottom. The D-shaped section 40c of the stem 40a is inserted into the D-shaped hole 46a of the operating wheel 46.

The end portion of the stem 40a opposite to the screw 40 is inserted into the cylindrical portion 46b, with a spring 48 being disposed around the stem 40a in the cylindrical portion 46b. The operating wheel 46 is rotatably supported on the wall of the first battery pack 22, with the spring 48 biasing the screw 40 toward the flat surface 22a of the first battery pack 22. Thus, when the first battery pack 22 is moved toward the apparatus body, the screw 40 comes into contact with the first mechanical connection means (threaded hole) 32. The operating wheel 46 is exposed to the outside from an opening 22d provided in the end surface 22c of the first battery pack 22, and when the exposed portion of the operating wheel 46 is rotated, the screw 40 is rotated so as to be threadedly engaged with the first mechanical means (threaded hole) 32.

In addition, a hook-like lock 50 is provided at the free end of the part 18 including the display 16, and an engaging hole 52 is provided in the upper portion of the curved side surface 22b of the first battery pack 22. Thus, when the part 18 including the display 16 is closed to the part (body) 14 including the keyboard 12 having the first battery pack 22 attached to the part (main body) 14 including the keyboard 12, the hook-like lock 50 is engaged with the engaging hole 52. The hook-like lock 50 may be unlocked by means not shown.

The second battery pack 24 has a similar engaging hole 54. The second battery pack 24 is attached to the rear portion of the part (main body of the apparatus) 14 including the keyboard 12 with the engaging hole 54 facing downward. Thus, the engaging hole 54 of the second battery pack 24 usually cannot be seen.

In this manner, the electronic apparatus 10 according to the present invention characterized in that it comprises the apparatus body, the first attachment portion 26 to which the first battery pack 22 can be attached as the first component, and the second attachment portion 28 which is provided in the apparatus body at a position different from the first attachment portion 26 and has a substantially same structure as the first attachment portion 26 and to which the second battery pack 24 can be attached as the second component.

The first battery pack 22 has the same appearance and shape as the second battery pack 24. Therefore, two battery packs 22 and 24 of the same shape may be attached to the electronic apparatus 10 such that, when one of the batteries has run down, the electronic apparatus can be operated with the other battery, or the capacity of the two batteries can be adapted to a desired operation of the electronic apparatus. Since two battery packs 22, 24 of the same shape can be attached to the electronic apparatus 10, the cost for the development of the battery packs 22 and 24 (in particular, development of a mold die) can be kept low. When battery packs of the same shape and greater capacity are developed, attachment to the apparatus body is simplified and battery life can be made longer than before. Or, a user may select, in combination, a suitable weight and capacity as he or she desires. Or, battery packs of increased capacity can be easily realized in which various combinations of weight and capacity may be achieved.

Although an example in which two battery packs 22 and 24 are provided is described above, the first and second components attached to the front and rear portions of the apparatus need not be both battery packs 22 and 24. It is only necessary that at least one of the first and second components is a battery pack. Thus, at least one of the first and second components may be a connector box to which additional component can be attached.

Figure 8:
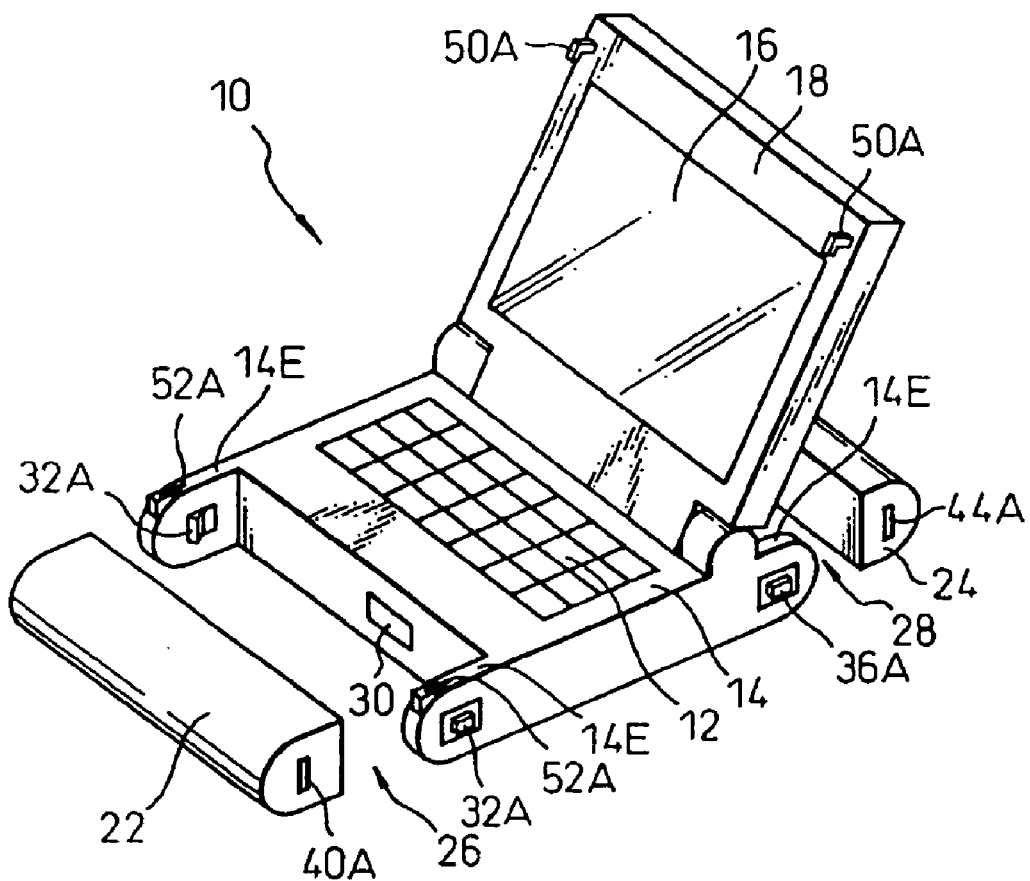
FIG. 8 is a perspective view showing an electronic apparatus according to the second embodiment of the present invention.
Figure 9:
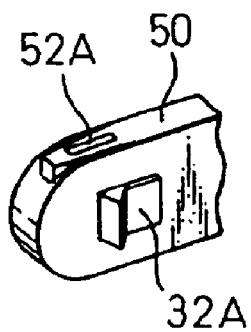
FIG. 9 is a perspective view showing a part of the electronic apparatus of FIG. 8.

FIGS. 8 and 9 are views showing an electronic apparatus according to the second embodiment of the present invention. The electronic apparatus (information processing apparatus) 10 has a part 14 including a keyboard 12, and another part 18 including a display 16. As in the first embodiment, a first battery pack 22 is attached to the front of the part 14 including the keyboard 12 at a first attachment portion 26, and a second battery pack 24 is attached to the rear portion of the part 14 including the keyboard 12 at a second attachment portion 28.

In FIG. 8, in order to form the first attachment portion 26 and the second attachment portion 28, the front and rear of the part 14 including the keyboard 12 include end extension portions 14E such that the first battery pack 22 and the second battery pack 24 may be inserted between the end extension portions 14E toward the front end surface and the rear end surface. Connectors 30 and 34 are disposed in the front end surface and the rear end surface of the part 14 including the keyboard 12, respectively, so that the connectors 38 and 42 of the first battery pack 22 and the second battery pack 24 may be respectively engaged with the connectors 30 and 34. (For the connectors 30, 38, 42 not shown in FIG. 8, but refer to FIG. 4, for example.)

First and second mechanical connection means 32A and 36A are formed in the end extensions 50, 52 as inwardly facing elastically deformable protrusions. The protrusions 32A and 36A are formed so as to be engaged with engaging holes 40A and 44A provided in the end surfaces of the first battery pack 22 and the second battery pack 24. In addition, locks 50A are provided on both ends of the free end of the part 18 including the display 16, and engaging holes 52A are provided in the upper surfaces of the end extension portions 14E.

Operation of the electronic apparatus (information processing apparatus) 10 of this embodiment is the same as the operation of the electronic apparatus (information processing apparatus) 10 of the embodiment as shown in FIGS. 1 to 7.

Figure 10:
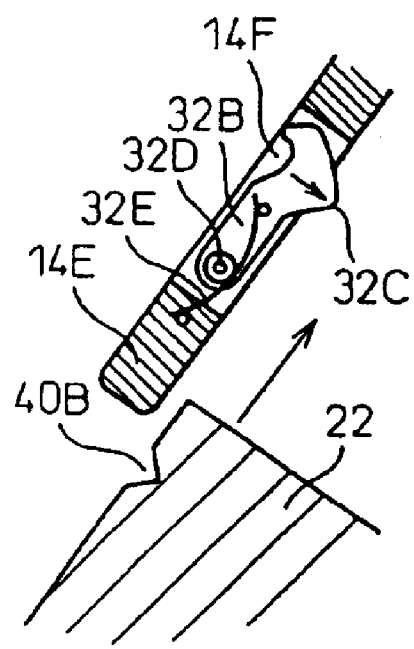
FIG. 10 is a cross sectional view showing a modification of a mechanical connection means of the battery pack.
Figure 11:
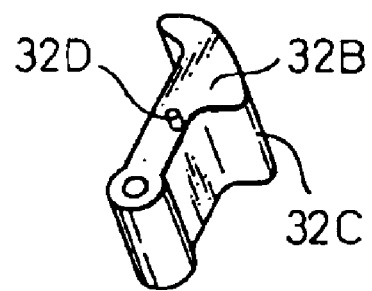
FIG. 11 is a perspective view showing the mechanical connection means of FIG. 10.

FIGS. 10 and 11 are views showing a modification of the mechanical connection means of the battery pack. In this modification, the mechanical connection means 32B of the battery pack comprises a rotatable locking member 32B disposed at an opening portion 14F provided in the end extension portion 14E of the part 14 including the keyboard 12. The locking member 32B includes protrusion 32C, which is to be engaged with a recess 40B of the end surface of the battery pack 22. The locking member 32B is mounted rotatably about an axis 32D to the end extension 14E, a spring 32E biasing the protrusion 32C in a direction for engagement with the recess 40B of the end surface of the battery pack 22. By pressing the end portion in the direction opposite to the protrusion 32C of the locking member 32B, the protrusion 32C can be unlocked from the recess 40B of the end surface of the battery pack 22.

Figure 12:
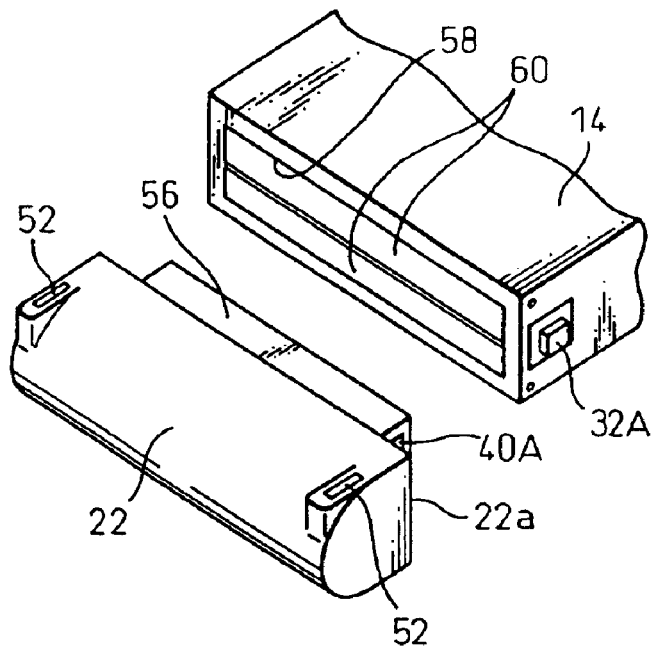
FIG. 12 is a perspective view showing a modification of a mechanical connection means of the battery pack.
Figure 13:
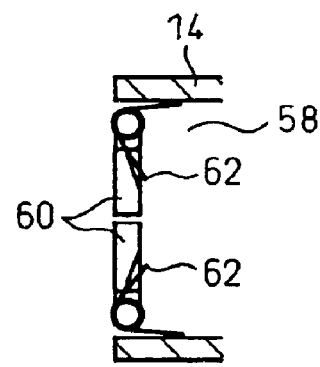
FIG. 13 is a perspective view showing the door portion of FIG. 12.
Figure 14:
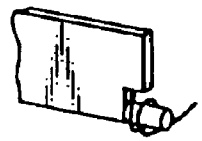
FIG. 14 is a perspective view showing the door member of FIG. 13.

FIGS. 12 to 14 are views showing a modification of the mechanical connection means of the battery pack. In contrast to the example shown in FIG. 8, which is constructed such that the front portion of the part 14 including the keyboard 12 has the end extension portion 14E, a projecting portion 56 is formed on the flat side surface 22a of the battery pack 22 in this example. The projecting portion 56 can move into an internal space 58 of the front end surface of the part 14 including the keyboard 12 such that a connector (not shown) provided in the projecting portion 56 is engaged with a connector (not shown) provided in the internal space 58. A mechanical connection means (protrusion) 32A is also provided so as to be engaged with an engaging hole 40A provided on the end surface of the projecting portion 56. In addition, a door 60 is disposed in the internal space 58 such that the door 60 is biased by a spring 62 so as to be normally closed, and is opened when the battery pack 22 is inserted into the internal space 58.

Figure 15:
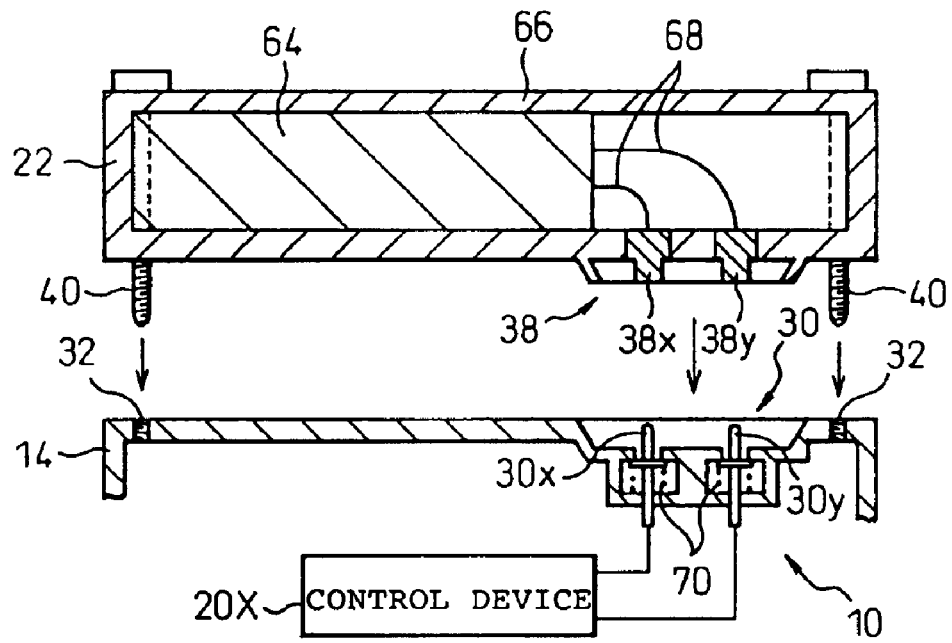
FIG. 15 is a cross sectional view showing an electronic apparatus according to the third embodiment of the present invention.

FIG. 15 is a cross sectional view showing an electronic apparatus according to the third embodiment of the present invention. The general construction of the electronic apparatus (information processing apparatus) 10 is the same as that shown in FIGS. 1 and 2. The electronic apparatus 10 comprises a part 14 including a keyboard 12, another part 18 including a display 16, a first battery pack 22 and a second battery pack 24 (see FIGS. 1 and 2).

In this embodiment, the battery pack 22 (24) is constructed such that a lithium cell 64 is molded with and covered by, resin 66. The lithium cell 64 is connected to the terminals 38x and 38y of the connector 38. The battery pack 22 (24) may include a control circuit connected to the lithium cell 64.

The part 14 including the keyboard 12 includes a connector 30 and a mechanical connection means 32. The mechanical connection means 32 include a threaded hole to be engaged with a screw 40. The connector 30 includes terminals 30x and 30y which are biased outwardly by a spring 70. Thus, when the battery pack 22 is pressed toward the part 14 including the keyboard 12, the terminals 38x and 38y of the connector 38 come securely into contact with the terminals 30x and 30y of the connector 30. The terminals 30x and 30y of the connector 30 are connected to a control device 20X provided on the printed circuit board 20.

Figure 16:
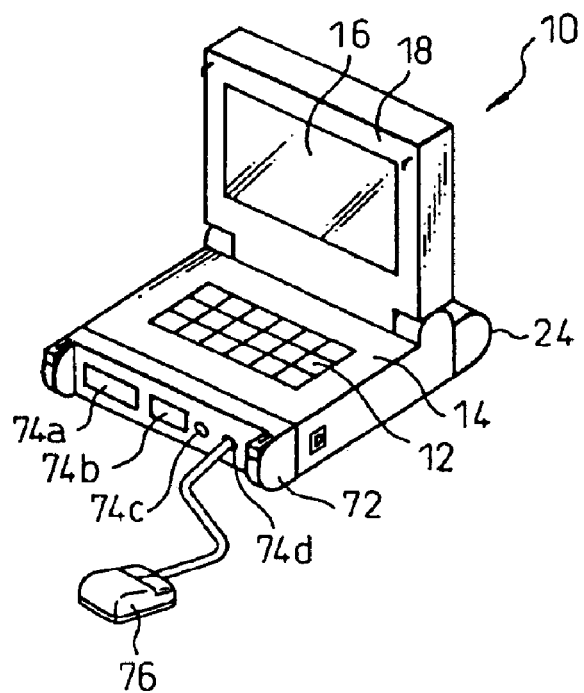
FIG. 16 is a perspective view showing an electronic apparatus according to the fourth embodiment of the present invention.

FIG. 16 is a view showing an electronic apparatus according to the fourth embodiment of the present invention. The electronic apparatus (information processing apparatus) 10 comprises a part 14 including a keyboard 12 and another part 18 including a display 16. The part 14 including the keyboard 12 includes a first attachment portion 26 and a second attachment portion 28 (see FIG. 2). A connector box 72 is attached to the front of the part 14 including the keyboard 12 at the first attachment portion 26, and a battery pack 24 is attached to the rear of the part 14 including the keyboard 12 at the second attachment portion 28. The connector box 72 includes a connector 38 to be fitted to a connector 30 of the first attachment portion 26, as well as a plurality of connectors 74a, 74b, 74c and 74d. In FIG. 16, a mouse 76 is attached to the connector 74d.

Figure 17:
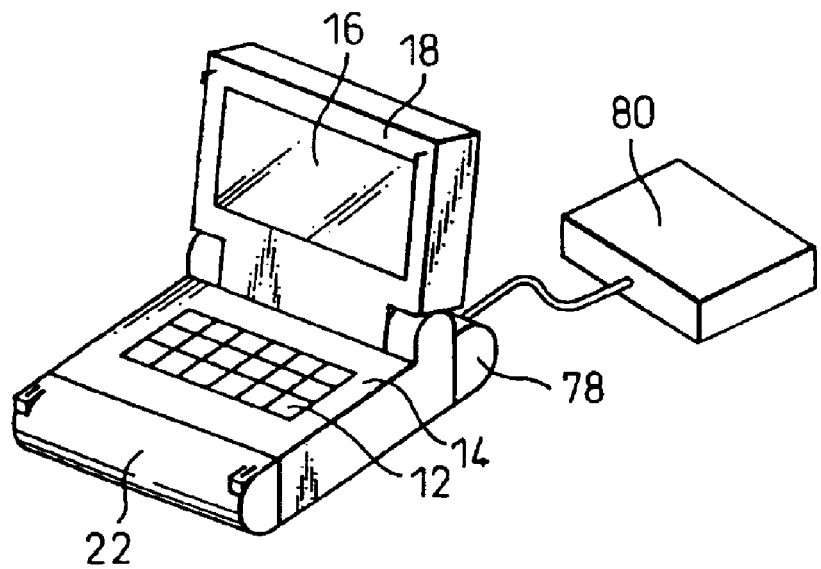
FIG. 17 is a perspective view showing an electronic apparatus according to the fifth embodiment of the present invention.

FIG. 17 is a view showing an electronic apparatus according to the fifth embodiment of the present invention. The electronic apparatus (information processing apparatus) 10 comprises a part 14 including a keyboard 12 and another part 18 including a display 16. The part 14 including the keyboard 12 includes a first attachment unit 26 and a second attachment unit 28 (see FIG. 2). A battery pack 22 is attached to the front of the part 14 including the keyboard 12 at the first attachment portion 26, and a connector box 78 is attached to the rear of the part 14 including the keyboard 12 at the second attachment portion 28. The connector box 78 is similar to the connector box 72 of FIG. 16 with a mouse 80 being connected to a connector of the connector box 78.

Figure 18:
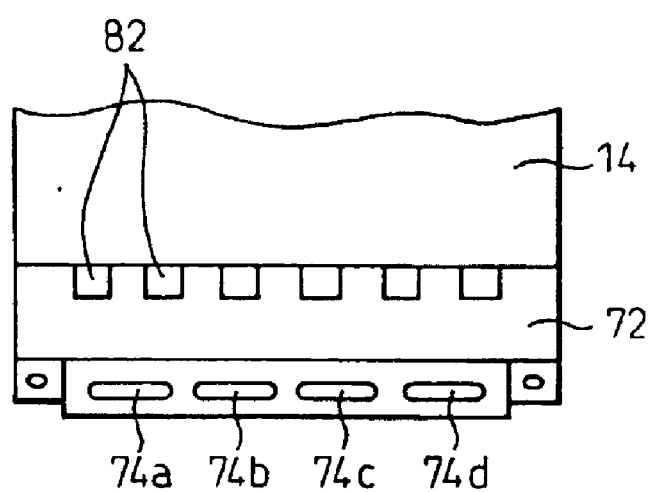
FIG. 18 is a plan view showing an electronic apparatus according to the sixth embodiment of the present invention.

FIG. 18 is a view showing an electronic apparatus according to the sixth embodiment of the present invention. In this embodiment, as in the embodiment shown in FIG. 16, a connector box 72 is attached to the front of the part 14 including the keyboard 12 at the first attachment portion 26. Slits 82 are provided in the side of the connector box 72 facing toward the part 14 including the keyboard 12 in order to dissipate heat generated in the part 14 including the keyboard 12. Otherwise, operation of the apparatus is the same as in the previous embodiment. The wiring in the connector box may be the same as disclosed in Japanese Unexamined Patent Publication (Kokai) No. 10-116133.

In this manner, a first component and a second component can be attached to an electronic apparatus to thereby improve the performance of the apparatus. If the first and second components are battery packs, two battery packs of the same shape can be attached to the electronic apparatus. When one of the batteries has run down, the other battery can operate the electronic apparatus. Or, the capacity of the two batteries may be adapted to achieve a desired operation of the electronic apparatus.

LIST OF REFERENCE NUMERAL

10 . . . electronic apparatus
12 . . . keyboard
14 . . . part including keyboard
14E . . . end extension portion
16 . . . display
18 . . . part including display
20 . . . printed circuit board
22 . . . battery pack
22a . . . flat side
22c . . . end surface
22b . . . curved side
22d . . . opening
24 . . . battery pack
24a . . . flat side
24b . . . curved side
24c . . . end surface
26 . . . attachment portion
28 . . . attachment portion
30 . . . connector
30x, 30y . . . terminal
32 . . . mechanical connection means (threaded hole)
32A . . . mechanical connection means (protrusion)
32B . . . mechanical connection means (locking member)
32C . . . protrusion
32D . . . axis
32E . . . spring
34 . . . connector
36 . . . mechanical connection means (threaded hole)
36A . . . mechanical connection means (protrusion)
38 . . . connector
38x, 38y . . . terminal
40 . . . screw
40a . . . stem
40b . . . large diameter section
40c . . . D-shaped section
40A . . . engagin hole
40B . . . recess
42 . . . connector
44 . . . screw
46 . . . operating wheel
46a . . . D-shaped hole
46b . . . dead-end cylinder
48 . . . spring
50 . . . lock
50A . . . lock
52 . . . engaging hole
54 . . . engaging hole
56 . . . projecting portion
58 . . . internal space
60 . . . door
62 . . . spring
64 . . . lithium cell
66 . . . resin
68 . . . lead
70 . . . spring
72 . . . connector box
74a, 74b, 74c, 74d . . . connector
76 . . . mouse
78 . . . connector box
80 . . . mouse

What is claimed is:

1. An information processing apparatus comprising a first attachment portion which is provided along an entire first side of an apparatus body and to which a first battery pack can be attached externally to the apparatus body, and a second attachment portion which is provided along an entire second side of said apparatus body which is opposite said first side and has a substantially same structure as the first attachment portion, and to which a second battery pack can be attached externally to the apparatus body.

2. The information processing apparatus according to claim 1, wherein the first attachment portion has a first connector for electrically connecting the first battery pack to the apparatus body and a first mechanical connection means for mechanically connecting the first battery pack to the apparatus body, and the second attachment portion has a second connector for electrically connecting the second battery pack to the apparatus body and a second mechanical connection means for mechanically connecting the second battery pack to the apparatus body, the relationship between the first connector and the first mechanical connection means being substantially the same as the relationship between the second connector and the second mechanical connection means.

3. The information processing apparatus according to claim 1, wherein the first battery pack has a generally same appearance and shape as the second battery pack.

4. An information processing apparatus comprising a first attachment portion which is provided in an apparatus body and to which a first battery pack can be attached, and a second attachment portion which is provided in the apparatus body at a position different from the first attachment portion and has a substantially same structure as the first attachment portion, and to which a second battery pack can be attached, wherein the first attachment portion is located at the front of the apparatus body and the second attachment portion is located at the rear of the apparatus body, and wherein the first and the second battery packs can be detachably attached to the apparatus body from outside the apparatus body.

5. An information processing apparatus according to claim 4, wherein the first battery pack and the second battery pack extend along the front and the rear, respectively, of the apparatus body.

6. An information processing apparatus according to claim 5, wherein the first battery pack and the second battery pack have lengths not less than half the length of the front or the rear of the apparatus body.

7. An information processing apparatus comprising a first attachment portion which is provided in an apparatus body and to which a first battery pack can be attached, and a second attachment portion which is provided in the apparatus body at a position different from the first attachment portion and has a substantially same structure as the first attachment portion, and to which a second battery pack can be attached, wherein the information processing apparatus is a notebook type information processing apparatus having a part including a keyboard and another part including a display and pivotally attached to the part including the keyboard, and wherein the first attachment portion and the second attachment portion are provided at the front and the rear of the part including the keyboard.

8. An information processing apparatus comprising a first attachment portion which is provided in an apparatus body and to which a first battery pack can be attached, and a second attachment portion which is provided in the apparatus body at a position different from the first attachment portion and has a substantially same structure as the first attachment portion, and to which a second battery pack can be attached, wherein the information processing apparatus is a notebook type information processing apparatus having a part including a keyboard and another part including a display and pivotally attached to the part including the keyboard, and wherein the first battery pack and the second battery pack have an engaging portion, and the part including the display has locking means capable of being engaged with the engaging portion of one of the first battery pack and the second battery pack attached to the front of the part including the keyboard when the part including the display is closed onto the part including the keyboard.

9. An information processing apparatus according to claim 4, wherein the first attachment portion has a first connector for electrically connecting the first battery pack to the apparatus body and a first mechanical connecting portion for mechanically connecting the first battery pack to the apparatus body, and the second attachment portion has a second connector for electrically connecting the second battery pack to the apparatus body and a second mechanical connecting portion for mechanically connecting the second battery pack to the apparatus body, the relationship between the first connector and the first mechanical connecting portion being substantially the same as the relationship between the second connector and the second mechanical connecting portion.

10. An information processing apparatus according to claim 4, wherein the first battery pack has a generally same appearance and shape as the second battery pack.

11. An information processing apparatus comprising:
an apparatus body;
a first battery pack detachably attached to a front of the apparatus body from outside the apparatus body; and
a second battery pack detachably attached to a rear of the apparatus body from outside the apparatus body.

12. An information processing apparatus having a part including a keyboard and another part including a display and pivotably attached to the part including the keyboard, comprising:
a first component detachably attached to a front of the part including the keyboard; and
a second component detachably attached to a rear of the part including the keyboard.

13. An information processing apparatus having a part including a keyboard and another part including a display and pivotably attached to the part including the keyboard, comprising:
a first battery pack detachably attached to a front of the part including the keyboard; and
a second battery pack detachably attached to a rear of the part including the keyboard,
wherein the first battery pack and the second battery pack have engaging portion, and the part including the display has locking means capable of being engaged with the engaging portion of one of the first battery pack and the second battery pack attached to the front of the part including the keyboard when the part including the display is closed onto the part including the keyboard.

14. An information processing apparatus having a part including a keyboard and another part including a display and pivotably attached to the part including the keyboard, comprising:
a first battery pack detachably attached to a front of the part including the keyboard; and
a second battery pack detachably attached to a rear of the part including the keyboard.

* * * * *